United States Patent

Osawa

[11] Patent Number: 5,090,538
[45] Date of Patent: * Feb. 25, 1992

[54] ELECTROMAGNETIC SPRING CLUTCH

[75] Inventor: Masanori Osawa, Iida, Japan

[73] Assignee: Tenryu Marusawa Kabushiki Kaisha, Nagano, Japan

[*] Notice: The portion of the term of this patent subsequent to Jul. 11, 2006 has been disclaimed.

[21] Appl. No.: 683,566

[22] Filed: Apr. 9, 1991

Related U.S. Application Data

[63] Continuation of Ser. No. 392,619, filed as PCT/JP88/00021, Jan. 11, 1988, now abandoned.

[30] Foreign Application Priority Data

Jan. 28, 1987 [JP] Japan ................ 62-17790

[51] Int. Cl.⁵ .................................. F16D 27/00
[52] U.S. Cl. .................. 192/84 T; 192/81 C; 192/26
[58] Field of Search ............ 192/26, 81 C, 84 T

[56] References Cited

U.S. PATENT DOCUMENTS

| | | | |
|---|---|---|---|
| 3,006,448 | 10/1961 | Fox | 192/81 C |
| 3,021,512 | 2/1962 | Welsh et al. | 192/26 X |
| 3,177,996 | 4/1965 | Bates | 192/84 T X |
| 3,185,276 | 5/1965 | Sajovec | 192/84 T |
| 3,349,880 | 10/1967 | Baer | 192/84 T |
| 4,262,787 | 4/1981 | Takefuta | 192/84 T |
| 4,321,992 | 3/1982 | Gallo | 192/81 C |
| 4,465,171 | 8/1984 | Koyama | 192/81 C |
| 4,502,578 | 3/1985 | Koyama | 192/84 T X |
| 4,570,768 | 2/1986 | Nishimura et al. | 192/84 T X |
| 4,638,899 | 1/1987 | Kossett | 192/81 C |

Primary Examiner—Leslie A. Braun
Assistant Examiner—Nicholas Whitelaw
Attorney, Agent, or Firm—Jordan and Hamburg

[57] ABSTRACT

An electromagnetic spring clutch has an armature (40) which can be moved to and from in the axial direction thereof and cannot be rotated on the axis, and which is biased by a spring (46), and a coil spring (36) which covers over outer faces of a master driving axle (30) and a slave driving axle (34) and which is capable of being wound tightly in the rotational direction of the master driving axle (30). When an electromagnetic coil (20) is not energized, an engagement section (44a) at the end of the armature (40) and a hook (38) of the coil spring (36) are engaged to expand the inner diameter of the coil spring (36) and disconnect the master driving axle (30) and the slave driving axle (34). When the electromagnetic coil (20) is energized to attract the armature (40) thereto against the biasing force of the spring (46), the engagement section (44a) and the hook (38) are disengaged to reduce the inner diameter of the coil spring (36) and connect the master driving axle (30) and the slave driving axle (34), whereby a prescribed rotational angle of the master driving axle (30) is transmitted to the slave driving axle (34).

7 Claims, 5 Drawing Sheets

ELECTROMAGNETIC SPRING CLUTCH

This application is a continuation of application Ser. No. 07/392,619, filed as PCT/JP88/00021, Jan. 11, 1988, now abandoned.

FIELD OF TECHNOLOGY

The present invention relates to an electromagnetic spring clutch, more specifically an electromagnetic spring clutch for rotating a slave driving axle, which is driven by torque from a continuously rotating master driving axle, by prescribed rotational angle to rotate a driven member connected to the slave driving axle by the same angle.

BACKGROUND OF TECHNOLOGY

A pulse motor (or a stepping motor) is generally used as means for rotating a rotary member by a prescribed rotational angle, e.g. a roller of a paper feeder unit of a copying machine. The rotary shaft of the pulse motor changes its rotational angle in proportion to the number of pulses inputted. When the roller of the paper feeder unit is connected to the rotary shaft of the pulse motor, the roller can be rotated by prescribed angles.

However, when the pulse motor is continuously operated, accumulated error occurs and a rotational lag occurs. Therefore, precision machines should have a correction circuit, etc. and in the manufacturing process, the conventional field core has been formed like a cup so as to close the magnetic circuit of an electromagnetic coil. To form a cup-like shape, drawing work or boring work is required, so that there is also a problem of lower manufacturing efficiency.

DISCLOSURE OF THE INVENTION

The object of the present invention is to provide an electromagnetic spring clutch which is inexpensive and preferably used for rotating a rotary member stably by prescribed rotational angles.

The electromagnetic spring clutch of the present invention makes possible a rotary mechanism which has no accumulated error and which is less expensive than similar mechanisms used with a pulse motors. The mechanism can be secured stable operation even in continuous operation. Additionally, the field core can be provided quite easily and with low cost because it can be manufactured by forming the core section in a mere U shape, so that an inexpensive electromagnetic spring clutch can be provided.

BRIEF DESCRIPTION OF THE DRAWINGS

FIGS. 3(a) and 3(b) are sectional views of the electromagnetic spring clutch in which FIG. 3(a) shows the state of no electric current passing and FIG. 3(b) shows the state of electric current passing.

EMBODIMENTS

Figure 1:
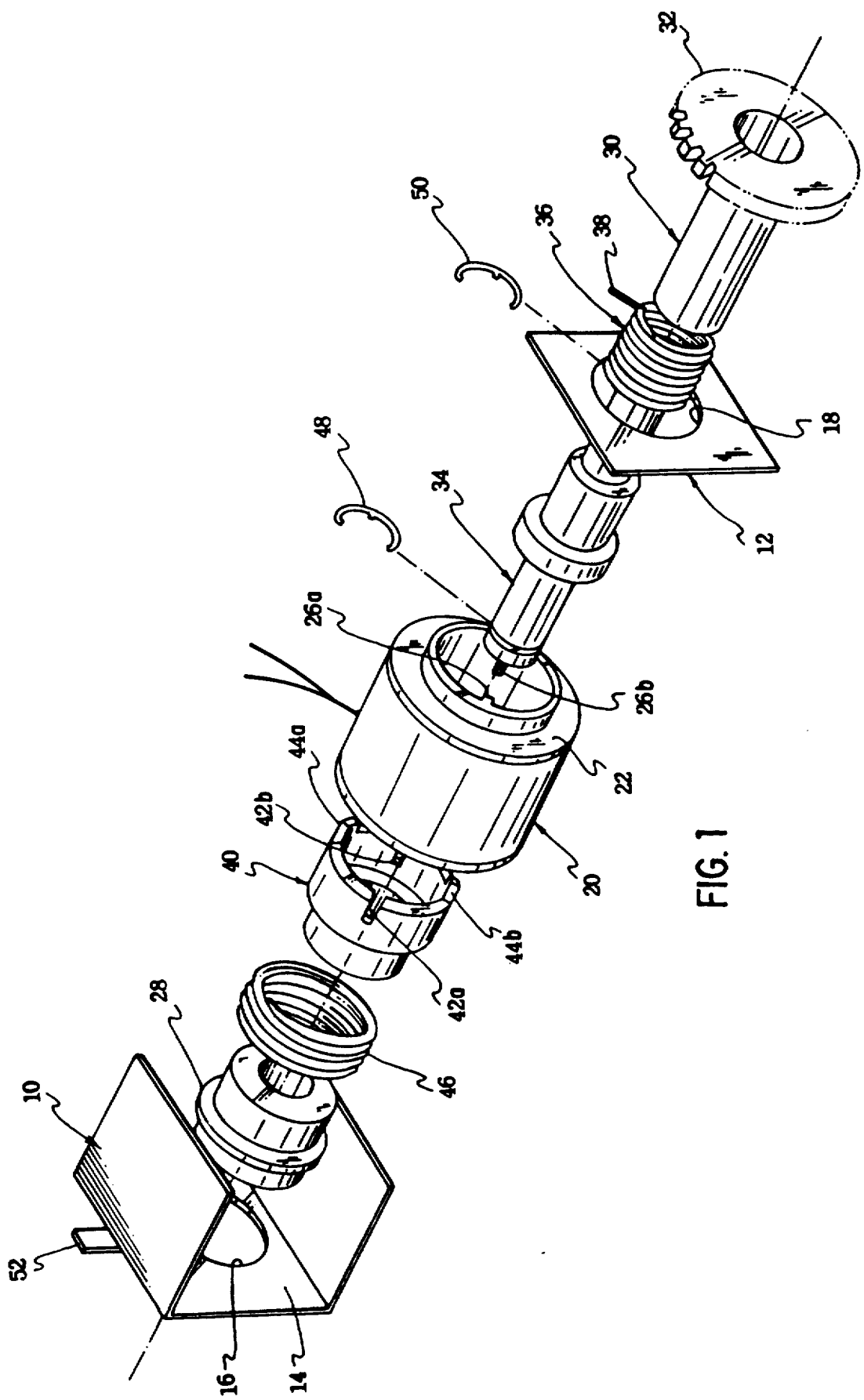
FIG. 1 is an exploded view of the electromagnetic spring clutch of the present invention.

Preferred embodiments of the present invention will now be described in detail with reference to the accompanying drawings.

A first embodiment is described with reference to FIGS. 1-3.

A field core consists of a core section 10 and a yoke section 12. The core section 10 is formed into U shape by bending a rectangular magnetizable plate. There is fixed a yoke section 12, which is also made of magnetizable material, at the open end of the core section 10. There are bored coaxial through-holes 16 and 18 in the bottom face 14 of the core section 10 and in the yoke section 12.

An electromagnetic coil 20 is formed by winding copper wire on a spool 22. The spool 22 is shown in FIG. 2. There are projecting latch sections 26a and 26b on the inner face of the cylinder section 24 of the spool 22 so as to prevent an armature, described later, from rotating.

Ferrous oilless bearing 28 is fit into the through-hole 16 of the core section 10 to bear a slave driving axle, described later.

An input gear 32, to which external force to drive a master driving axle 30 is inputted, is provided on one end section of the master driving axle 30.

A slave driving axle 34 is rotated when the external force inputted to the input gear 32 of the master driving axle 30 is transmitted.

There is formed a hook 38, which is bent in the radial direction, at one end section, on the master driving axle 30 side, of a coil spring 36. When no force acts on the hook 38, the coil spring 36 is tightly wound around the axles 30 and 34 to connect them as one body.

An armature 40 is provided to cover the coil spring 36. Its appearance is shown in FIG. 2. There are grooved notches 42a and 42b in the wall of the armature 40. The notches 42a and 42b can be respectively engaged with the latch sections 26a and 26b of the coil spool 22 to prevent the armature 40 from rotating relative to or coming out of the coil spool 22. On the master driving axle side of the armature 40 there are projecting engagement sections 44a and 44b for engaging with a side of the hook 38 of the coil spring 36.

A spring 46 as energizing means always biases the armature 40 toward the master driving axle 30.

Snap rings 48 and 50 define the position of each member on the slave driving axle 34.

A stopper 52 projects from the core section 10 of the field core. It is engaged with any suitable member to prevent the electromagnetic spring clutch from rotating when the electromagnetic spring clutch is assembled.

Next, the action of the above described electromagnetic spring clutch will now be described.

Figure 3A:
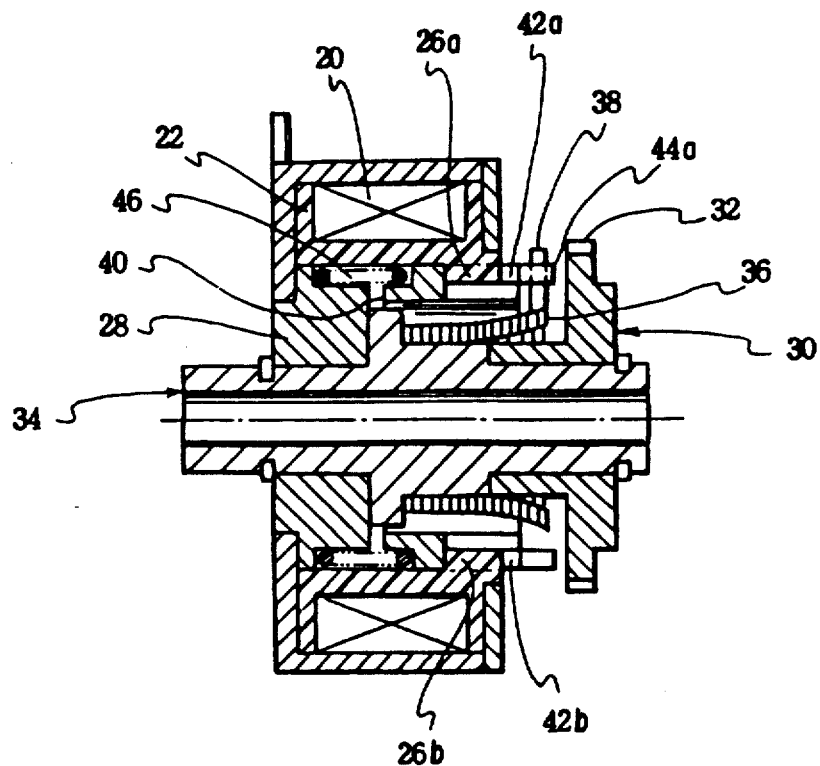
Figure 3B:
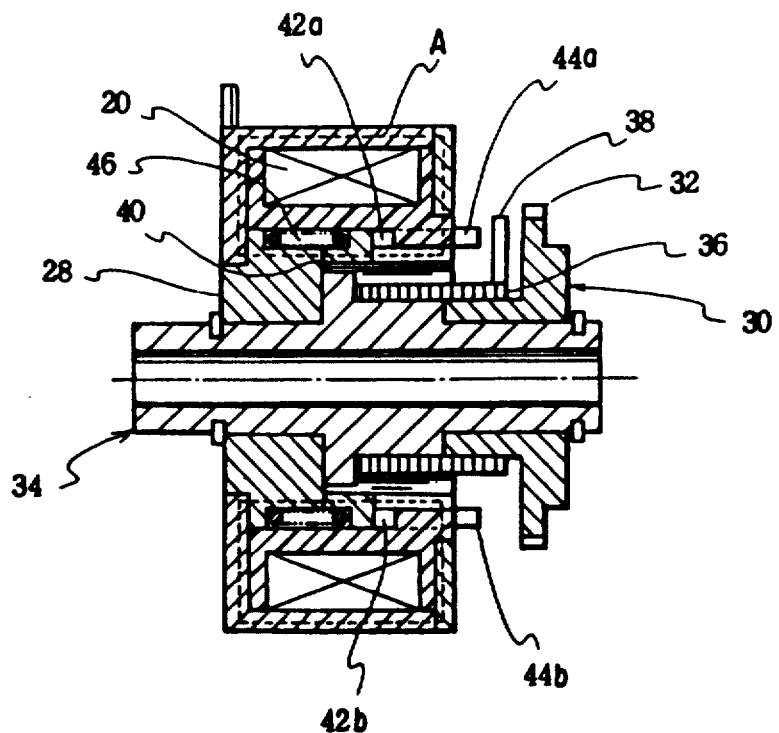

The state of no electric current passing through the electromagnetic coil 20 is shown in FIG. 3(a). The master driving axle 30 and the slave driving axle 34 are connected as in one body by the tightening force of the coil spring 36, so the both axles are rotated by external force (torque) inputted to the input gear 32. When both the axles 30 and 34 are rotated by the prescribed angle (e.g. 180° in this embodiment), the hook 38 of the coil spring 36 comes to engagement with the engage section 44a of the armature 40 which is biased outward by the spring 46. At that time, the notches 42a and 42b of the armature 40 and the latch sections 26a and 26b are already engaged, so that the armature 40 cannot rotate. Therefore, a counter force, whose direction of working is opposite the direction of the rotation of the coil spring 36, acts on the hook 38 of the coil spring 36, whereby the inner diameter of the coil spring 36 is gradually increased from one end section, on the master driving axle 30 side, so that the connection between the master driving axle 30 and the slave driving axle 34 is loosened and the slave driving axle 34 stops its rotation. Then only the master driving axle 30 continues to be rotated by the external force which is inputted to the input gear 32.

To rotate the slave driving axle 34 again, the electric current is passed through the electromagnetic coil 20. Upon the passing of the electric current, the magnetic circuit, as shown by dotted line A in FIG. 3(b), closes and the armature 40 is attracted toward the bearing 28 against the biasing force of the spring 46. At that time, the engagement section 44a, which has engaged with the hook 38 of the coil spring 36, is also moved toward the bearing 28, and then counter force acting on the hook 38 of the coil spring 36 disappears. Then the inner diameter, which has been increased, of the coil spring 36 decreases to wind tightly upon and connect the master driving axle 30 and the slave driving axle 34 as one body, so that both the axles 30 and 34 are rotated together by the external force inputted to the input gear 32.

Both the axles 30 and 34 are rotated together when electric current is passing through the electromagnetic coil 20. When the electric current stops, the armature 40 is moved to the former position again by the biasing force of the spring 46, so that the hook 38 of the coil spring 36 is able to engage with the engagement section 44b. In this embodiment, as obviously shown in FIG. 2, the engagement sections 44a and 44b are mutually spaced at an angle of 180°, so that the slave driving axle 34 can be rotated every 180°. The slave driving axle 34 can be rotated by an optional angle (including an angle of more than 360°) based on the number and position of the engagement sections.

Note that, in this embodiment, the core section 10 of the field core can be formed by merely bending a rectangular plate, so that manufacturing of the core section 10 of the field core can be executed efficiently, and manufacturing cost can be reduced. Additionally, the yoke section 12 is fixed, as shown in this embodiment, at the open end of the core section 10. The yoke section 12 for closing the magnetic circuit is not required to be formed on the armature 40, so that an extra manufacturing step of forming a flange section on the armature 40 and in waste of material resulting from the cutting work to form the flange section are avoided.

Figure 4:
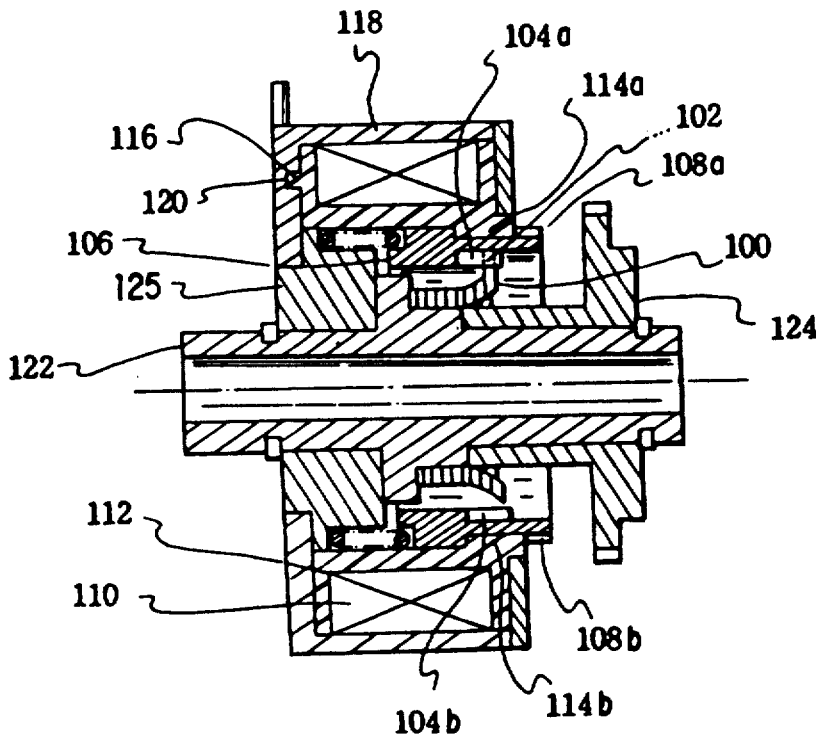
FIGS. 4-6 are sectional views of other embodiments.

Next, another embodiment shown in FIG. 4 will now be described.

In this embodiment, engagement sections 104a and 104b for engaging with a hook 102 of a coil spring 100 are provided on an inner face of an armature 106. Rotation of the armature 106 is prevented by engaging notches 108a and 108b, which are grooved therein, with latch sections 114a and 114b which project from an inner face of a coil spool of an U-shaped electromagnetic coil 110. A boss 116 projects from the inner end face of the coil spool 112, and it can be fitted into a boss-hole which is bored in a bottom face of a core section 118 of a field core when the electromagnetic coil 110 is assembled into the core section 118 of the field core. With this fit of the boss 116 and the boss-hole 120, the electromagnetic coil 110 can be correctly positioned, and the engagement sections 104a and 104b of the armature 106 also can be correctly positioned, so that the rotational angle of a slave driving axle 122 can be defined correctly.

In the electromagnetic spring clutch of this embodiment, the coil spring 100 is wound around, a master driving axle 124 and the slave driving axle 122 to rotate both axles together. When the hook 102 of the coil spring 100 is engagement with the engage section 104a, the coil spring 100 is loosened and the slave driving axle 122 stops its rotation. Upon passing electric current through the electromagnetic coil 110, the armature 106 is attracted toward a bearing 125 and the engagement section 104a is retracted with the attraction of the armature 106, so that the engaging of the hook 102 and the engagement section 104a is released and the coil spring 100 tightly winds around both the axles 122 and 124 so that they again rotate together.

Figure 5:
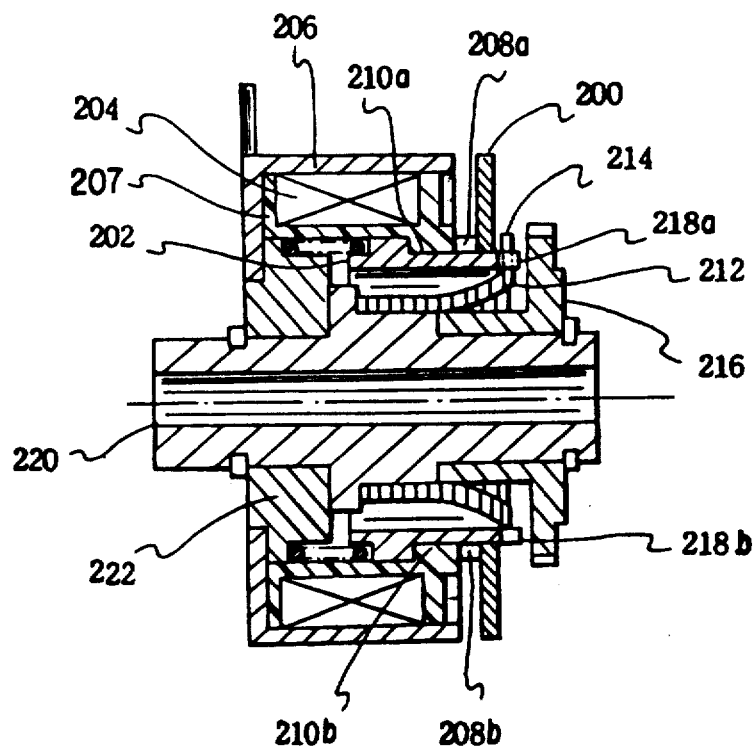

Next, another embodiment shown in FIG. 5 will now be described.

In this embodiment, a yoke section 200 of a field core is provided on an outer face of an armature 202. Upon passing electric current through an electromagnetic coil 204, a yoke section 200 closes an opening of a core section 206 which is formed U shape and constitutes the field core with the attraction of the armature 202. The rotation of the armature 202 is prevented by engaging notches 208a and 208b, which are grooved in the armature 202, with latch sections 210a and 210b which project from an inner face of a coil spool 207. The yoke section 200 is, for example, keyed on the armature 202. A hook 214 of a coil spring 202 can be engaged with engagement sections 218a and 218b which project from an edge of the armature 202 on a master driving axle 216 side.

In this embodiment, too, the inner diameter of the coil spring 212 increases when the hook 214 of the coil spring 212, the latter which has been tightly wound around the master driving axle 216 and the slave driving axle 220 so that they rotated together, engages with the engagement section 218a, so that the rotation of the slave driving axle 220 stops. Upon passing electric current through the electromagnetic coil, the armature 220 is attracted toward the bearing 222 and the engagement section 218a is thereby retracted, so that the engagement of the hook 214 and the engagement section 218a is released. With the release, the inner diameter of the coil spring 212 decreases again so that the spring 212 is again tightly wound around the master driving axle 216 and the slave driving axle 220, so that both the axles 216 and 220 rotate together again.

Figure 6:
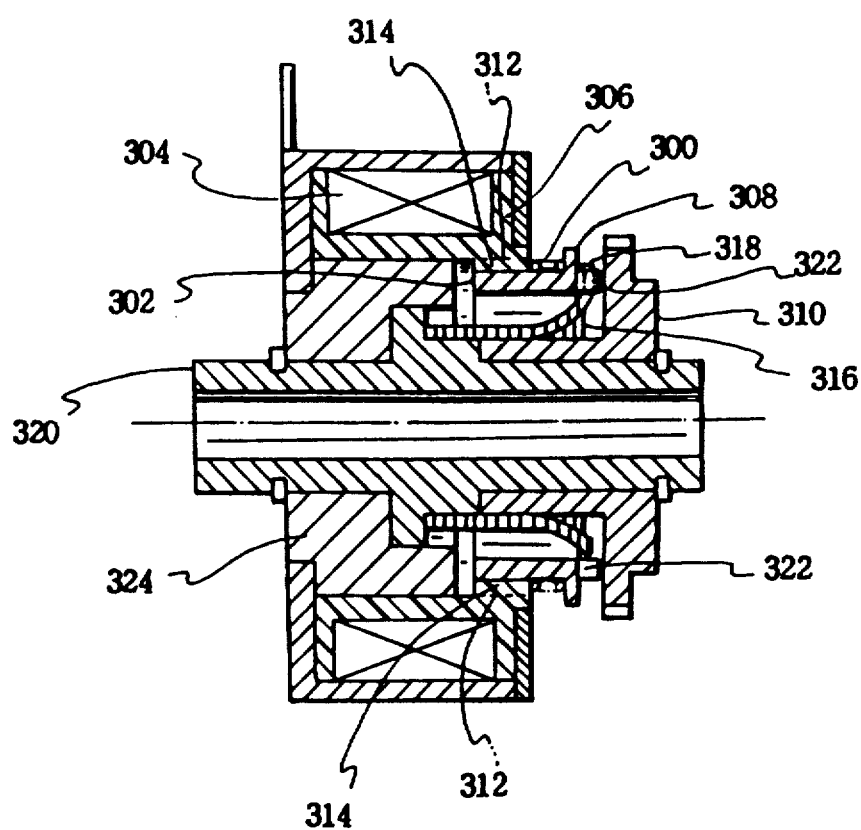

Next, another embodiment shown in FIG. 6 will now be described.

Figure 2:
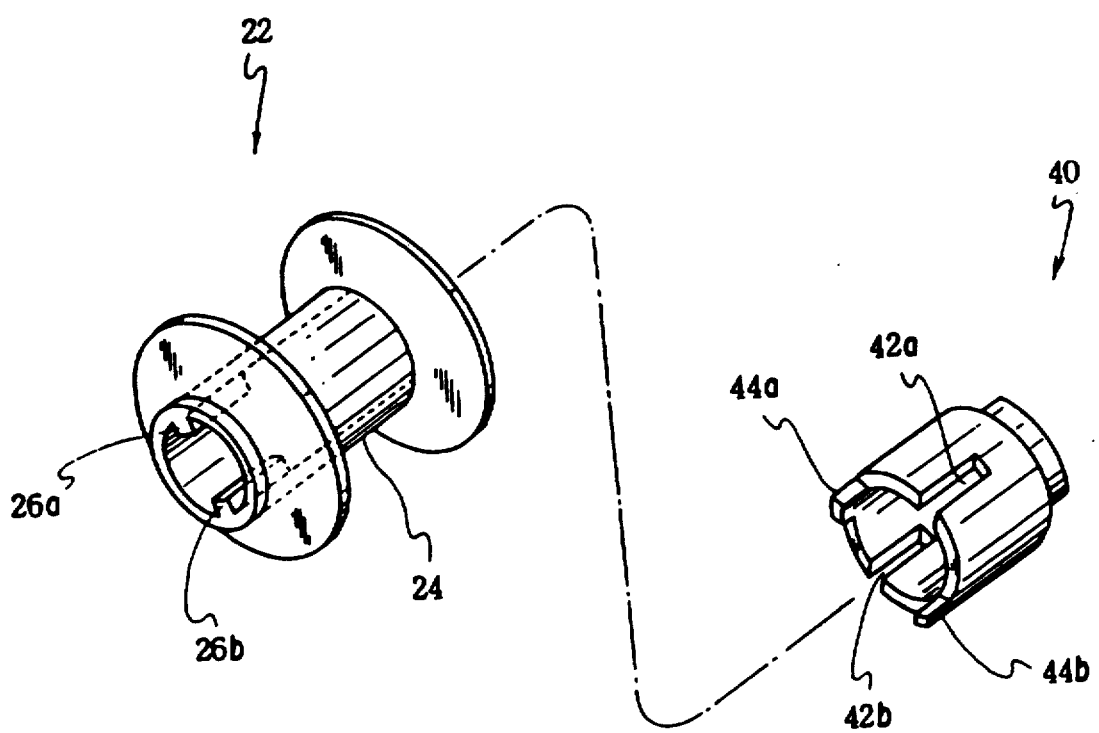
FIG. 2 is perspective views of a coil spool and an armature thereof.

In this embodiment, a spring 300 as energizing means is provided to cover over an outer face of an armature 302 and it is positioned outside of an electromagnetic coil 304 and a field core which is formed the same as the one in the embodiment shown in FIG. 1. Both ends of the spring contact a coil spool 306 and a flange 308 which is formed on the outer face of the armature 302, so that the armature is biased toward the master driving axle 310. The rotation of the armature is prevented by engaging notches 312a and 312b grooved in the armature 302 with latch sections 314a and 314b projecting from the inner face of the coil spool 306. The coil spring 316 is wound around the master driving axle 310 and a slave driving axle 320 so that they rotate together and the hook 318 of the coil spring 318 engages with an engagement section 322a which is projected from an edge on the master driving axle 310 side, of the armature 302, so that the inner diameter of the coil spring 316 is expanded to stop the rotation of the slave driving axle 320. Upon passing electric current through the electromagnetic coil 314, the armature is attracted toward a bearing 324 and the engagement section 322a is thereby retracted, so that the engagement of the hook 316 of the coil spring 318 and the engagement section 322a is released and the inner diameter of the coil spring 318 decreases and the coil spring 318 is tightly wound around both axles 310 and 320 so that they rotate together.

Preferred embodiments of the present invention have been described in detail but the present invention is not limited to the above described embodiments, as many modifications, of course, can be allowed without deviating the scope of the invention.

I claim:

1. An electromagnetic spring clutch comprising,
a field core with a built-in electromagnetic coil;
an armature being arranged in said electromagnetic coil, said armature being cylindrical and being capable of moving in the axial direction thereof;
a master driving axle being arranged coaxial to said armature;
a slave driving axle being arranged coaxial to said master driving axle; and
a coil spring being arranged to bridge and to cover said master driving axle and said slave driving axle in said armature, one end of said coil spring being capable of engaging with said armature, said coil spring tightening in the direction of the rotation of said master driving axle,
wherein said field core has a U-shaped core section comprised of a plate material bent into a U-shape having open sides and an open end and a yoke section which fixed to the open end of said core section, said yoke section having a through-hole in the middle thereof in which said cylindrical armature is movably inserted, and
said armature is arranged to be movable in the axial direction of said electromagnetic coil and is unable to rotate on the axis thereof, said armature is biased to move away from said electromagnetic coil by energizing means, and engages with the one end of said coil spring when it is biased to move away from said electromagnetic coil by said energizing means, the engagement with the one end of said coil spring is released when the electric current passes through said electromagnetic coil and said armature is attracted toward said electromagnetic coil against the biasing force of said energizing means.

2. The electromagnetic spring clutch according to claim 1, wherein one end of said coil spring is formed as a hook which is bent in the radial direction thereof, an engagement section is projected in the axial direction from the end face of said armature, said hook being capable of engagement with said engage section when said armature is biased to move away from said electromagnetic coil by said energizing means.

3. The electromagnetic spring clutch according to claim 1, wherein one end of said coil spring is formed as a hook which is bent in the radial direction thereof, an engagement section is projected from the inner face of said armature (106), said hook is capable of engaging with said engagement section when said armature (106) is biased to move away from said electromagnetic coil (110) by said energizing means.

4. The electromagnetic spring clutch according to claim 1, wherein the rotation of said armature is prevented by engaging notches or latches provided on the outer face of said armature (40) with latches or notches provided on the inner face of the coil spool of said electromagnetic coil.

5. The electromagnetic spring clutch according to claim 1, wherein the armature is prevented from coming off from said electromagnetic coil by engaging a notch or a latch provided on the outer face of said armature with a latch or a notch provided on the inner face of the coil spool of said electromagnetic coil.

6. The electromagnetic spring clutch according to claim 1, wherein said energizing means is a coil spring arranged in said electromagnetic coil.

7. The electromagnetic spring clutch according to claim 1, wherein said energizing means is a single coil spring which is provided between a flange formed on the outer face and in the vicinity of outer end of said armature and said electromagnetic coil or said field core.

* * * * *